United States Patent [19]
Bohn

[11] Patent Number: 5,813,707
[45] Date of Patent: Sep. 29, 1998

[54] TROUGH-LIKE AIRBAG HOUSING

[75] Inventor: Stefan Bohn, Goldbach, Germany

[73] Assignee: MST Automotive GmbH, Aschaffenburg, Germany

[21] Appl. No.: 728,926

[22] Filed: Oct. 11, 1996

[30] Foreign Application Priority Data

Oct. 19, 1995 [DE] Germany ............. 195 38 870.4

[51] Int. Cl.⁶ .................................................. B60R 21/22
[52] U.S. Cl. ................... 280/728.2; 280/732; 280/728.1
[58] Field of Search ............................. 280/728.2, 732, 280/728.1, 730.2, 741, 740, 736

[56] References Cited

U.S. PATENT DOCUMENTS

| | | | |
|---|---|---|---|
| 4,013,010 | 3/1977 | Schneiter et al. | 280/741 X |
| 5,062,664 | 11/1991 | Bishop et al. | 280/743 |
| 5,553,887 | 9/1996 | Karlow et al. | 280/730.2 |
| 5,588,675 | 12/1996 | Lotspih | 280/732 X |

FOREIGN PATENT DOCUMENTS 2281259  3/1995  United Kingdom ............. 280/741

Primary Examiner—Christopher P. Ellis
Attorney, Agent, or Firm—Sprung Kramer Schaefer & Briscoe

[57] ABSTRACT

To accommodate a gas generator of an airbag for front-seat passenger protection in a motor vehicle, a trough-like housing is proposed which has a constant U-shaped cross section on its length, and flat sidewalls at its ends, which is characterized by two half shells of substantially mirror-image configuration made by casting in a mold with integrally attached side wall halves and by joining the two half shells. The manufacturing method to be applied according to the invention permits flexible adaption of the trough-like housing both to local space requirements and to functional requirements. The housing is especially light and can be made very inexpensively.

17 Claims, 2 Drawing Sheets

TROUGH-LIKE AIRBAG HOUSING

BACKGROUND OF THE INVENTION

The invention relates to a trough-like housing made by casting in a mold, having a U-shaped cross section that is the same along its length, and flat end walls to accommodate a gas generator and an airbag for a system for protecting a front-seat passenger in a motor vehicle.

To an increasing extent, automobile manufacturers are offering airbags for the passenger as extra equipment, or even as standard equipment. Their aim is to manufacture such airbag modules as inexpensively as possible in order to be able to offer the customer the additional safety at the lowest possible cost. All elements of the airbag module are critically analyzed and examined for possible cost savings. In the case of a housing, savings can be achieved especially by not only adapting it to the existing, sometimes narrow and angular installation conditions, but vice-versa by configuring the areas of the motor vehicle body, especially the instrument panel, for the installation of an airbag. In this manner the possibility is created for designing a single housing for a plurality of applications and for exploiting the manufacturing advantages for the production of large numbers of units.

In German patent 43 38 666 A1 there is disclosed an airbag housing of the kind mentioned above, in which fastening means are integrally formed so as to be adapted to one specific installation situation. Moreover, the entire airbag housing is to be manufactured in one piece by injection molding. This requires a very complex mold, which furthermore can be used only for one particular application, and which is still largely determined by the idea that the airbag housing must be adapted to one particular application. It is not possible in this manner to achieve and offer an especially cost-effective front-seat passenger protective device.

SUMMARY OF THE INVENTION

The invention is addressed to the problem of proposing a housing of the kind named above, which, while providing for the above-mentioned considerations, will be as simple and inexpensive as possible to make and which will be as light as possible without having to put up with operational disadvantages.

For the solution of this problem, a trough-like housing is proposed by the invention, which is characterized by two half shells of a substantially mirror image configuration and made by casting in a mold, having integrally attached side-wall halves, as well as by means for joining the two half shells. The invention is based on the idea of creating an airbag housing with the fewest possible parts, which due to its method of manufacture will be flexible as to its configuration on the one hand, but on the other hand will be suitable for modern series manufacture. The proposed housing consists of only two components, aside from the joining means, which can be produced by casting in a mold. In particular, pressure-casting aluminum alloys as well as plastics can be considered. If plastics are used, it is expedient to use a double mold in which the two half shells can be made simultaneously, and with which a film hinge can be formed at the bottom junction surface, so that half shells that belong together are already loosely connected together. This has the advantage that only half shells will be assembled which originate from the same batch of material.

On account of this freedom of configuration, it is easily possible for the side wall halves to have openings for mounting a cylindrical gas generator. Also, it is easily possible for the half shells to have a bottom that is of quarter-circular shape in cross section, and thus can be adapted optimally to the cylindrical gas generator.

At the bottom junction part of the half shells, it is expedient to form outwardly projecting flanges to be placed together in the assembled state. These extend substantially only parallel to the plane of division of the housing and are configured for the insertion of self-tapping screws penetrating both flanges.

Alternatively, flanges can be provided which have a section running substantially parallel to the plane of division of the housing, as well as a section projecting outwardly therefrom at right angles, the flanges being joined together by means of a clip slid over outwardly projecting sections. The clip can extend over the entire length of the housing, or can consist of a plurality of sections distributed over the length of the housing. At the ends the two half shells are joined together advantageously by mounting plates which are attached to the side wall halves and serve simultaneously to fasten the housing in the automobile body.

An additional advantage of the chosen manufacturing process is that the walls of the half shells can be reinforced internally and/or externally by a pattern of ribs, the thickness and distribution of the ribs being precisely adaptable to the local stresses affecting the housing.

For the precise positioning of the two half shells with respect to one another, projecting centering bosses are desirably provided in one of the junction surfaces, and matching recesses in the other junction surface.

In another embodiment of the invention provision is made for the walls of the half shells to have on the inside, at about half their height, slot-like openings confronting one another and extending perpendicular to the wall and over the entire length of the housing, into which the lateral edges of a plate for holding the airbag can be inserted, and fastened without any other means. During assembly, the airbag with its holding plate and the gas generator can be inserted into one of the two half shells, and then the other half shell can be attached. Due to the recesses for the holding plate and the gas generator, the latter components can be positioned and held in the housing by simply putting them together without the need for other fastening means. The recesses for the holding plate are expediently formed by two inwardly projecting, elongated ribs which are stiffened by ribs disposed perpendicular to them. The method of casting used is best suited to this embodiment.

At the upper end of the half shells, holes can be provided on the entire periphery for the insertion of self-tapping screws for fastening a covering. Moreover, it is advantageous to provide posts provided with bores for the insertion of self-tapping screws for the attachment of the mounting plate.

It is thus to be found that, according to the basic idea of the invention, a trough-like airbag housing can be created which by its freedom of configuration is easily adapted to all purposes and is suitable equally for large and small series production.

Additional details will be given with the aid of the embodiment represented in FIGS. 1 to 3, wherein:

DETAILED DESCRIPTION OF THE INVENTION

Figure 1:
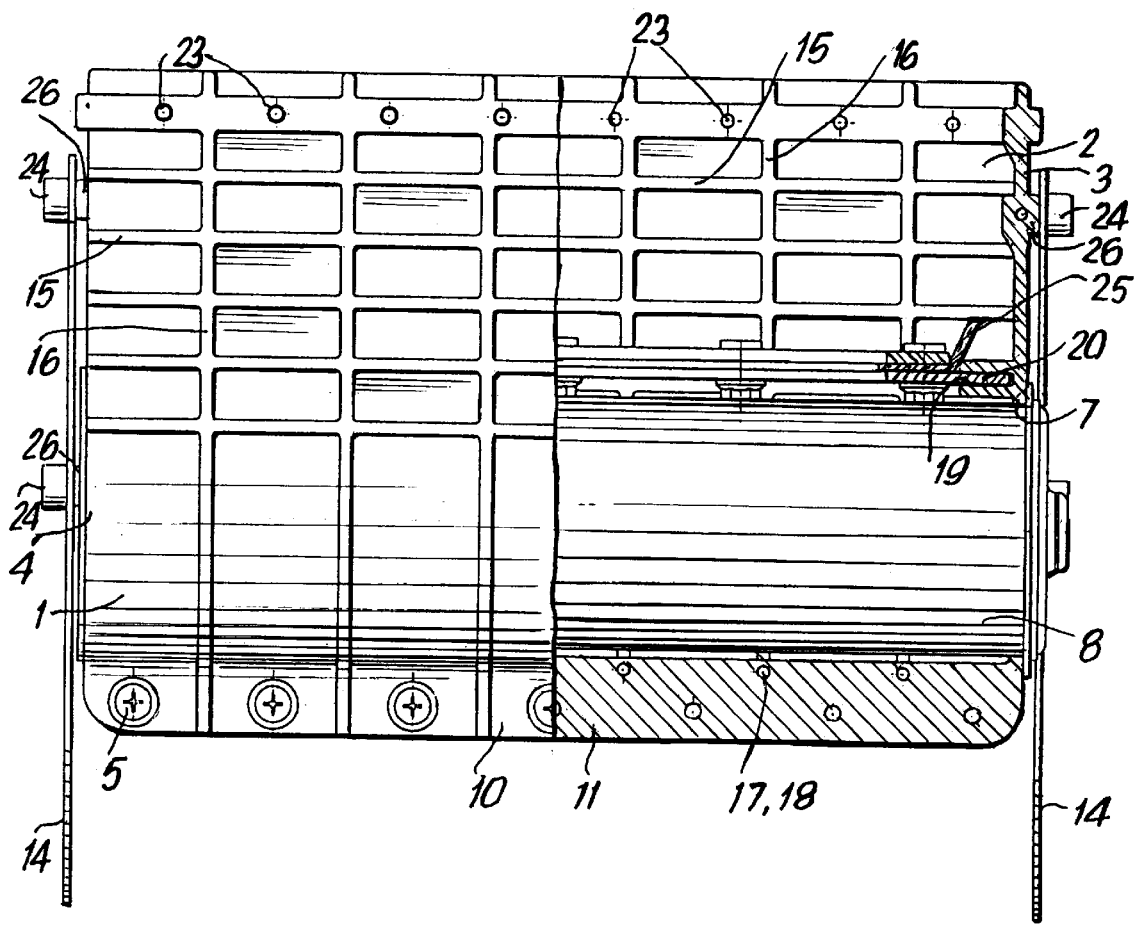
FIG. 1 is a side view and a longitudinal section of an embodiment.

The trough-like housing of FIG. 1 consists of a front half shell 1 and a back half shell 2, the outer side of half shell 1 appearing on the left, and the inner side of half shell 2 appearing on the right. In the embodiment a rectangular array of ribs 15, 16 is created, both on the outer side (left) and on the inner side (right). In the bottom area the half shells 1 and 2 have each a flange 10 and 11 extending parallel to the junction surface, the two halves being joined in this area by self-tapping screws 5. The end side-wall halves 3 and 4 have openings 7 for mounting the gas generator 8. It can also be seen in FIG. 1 that centering bosses 17 and matching recesses 18 are provided. Furthermore, on the upper margin of the housing a row of holes 23 is provided into which the self-tapping screws can be inserted for fastening a cover. At the end side wall halves 3 and 4, raised portions 26 are formed, which also have holes for inserting self-tapping screws 24 for attaching the mounting plates. The walls of the half shells 1 and 2 have on their inner side slots 19 running lengthwise at about the middle of their height over the entire length of the housing, into which the lateral margins of a mounting plate 20 for the airbag 25 can be inserted. The airbag 25 is joined by screws 27 to the mounting plate 20.

Figure 2:
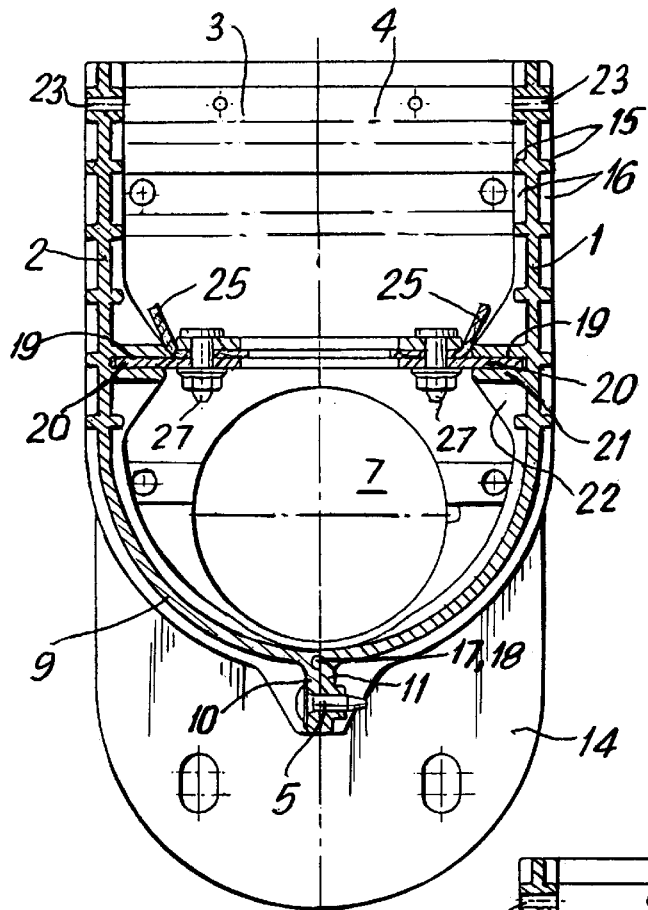
FIG. 2 a cross section through the embodiment in FIG. 1.
Figure 3:
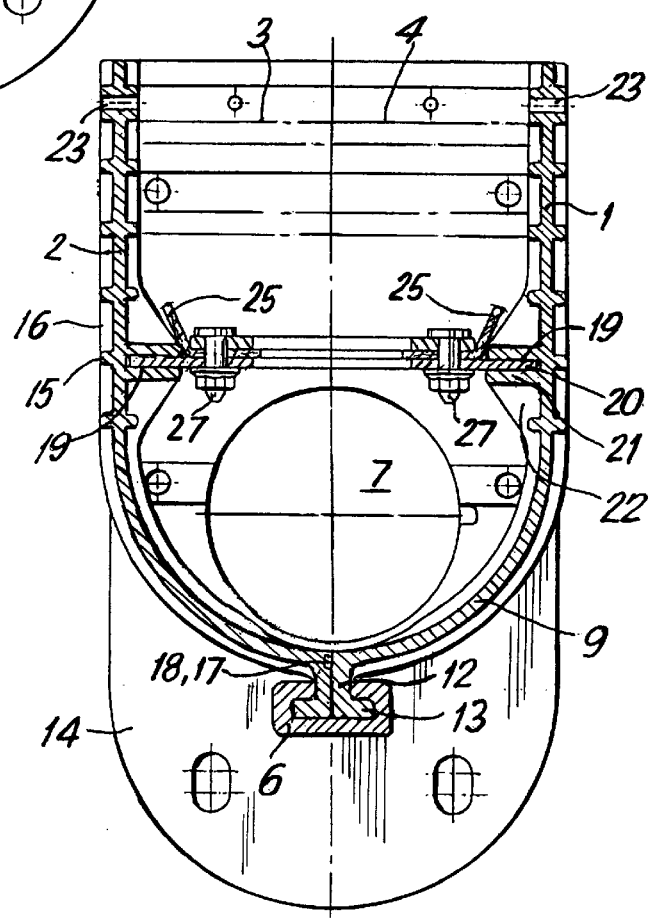
FIG. 3 a cross section of the embodiment in FIG. 1, with an alternative for binding together the two half shells.

In the sectional representation in FIGS. 2 and 3 can be seen especially the shape of the ribs 15 and 16 and of the ribs 21 and 22 which form the slot 19. The side wall halves 3 and 4 have an opening 7 for mounting the gas generator (not shown here). The half shells 1 and 2 are fastened together by means of self-tapping screws 5 inserted into the bottom flanges 10 and 11 and by means of the mounting plates 14. Bosses 17 and recesses 18 serve for centering.

In FIG. 2 is also to be seen that the bottom area 9 is of a quarter-circular shape, and that holes running around the upper margin of the half shells 1 and 2 are provided for attaching a covering.

FIG. 3 differs from FIG. 2 only in that, instead of the screws 5, a clip 6 is provided to join together the two half shells 1 and 2. For this purpose the flanges have a section 12 running parallel to the plane of division of the housing, as well as a section 13 extending outwardly at right angles therefrom. The clip can be displaced along the length of the flanges to join the two half shells 1 and 2. Also, to save material, the clip can consist of a plurality of sections distributed over the length of the housing. Otherwise, the representation in FIG. 3 corresponds to that in FIG. 2, so that repetition of the explanations given is unnecessary.

The invention permits a simple and inexpensive configuration of an airbag housing which takes into account the requirements stated above, and which, due to the chosen method of formation, is easily adapted to different requirements. The cost of materials can be considerably reduced in comparison with conventional designs, because it is possible to match the necessary wall thicknesses to the local stresses. This purpose is also served by the ribbing with which provision can be made throughout for the necessary rigidity and strength of the housing. Since aluminum alloys and plastic are used preferentially the airbag housing of the invention can also be made especially light in weight to satisfy the need for saving weight in motor vehicles. On the other hand, the half shells can also be designed to meet functional requirements.

I claim:

1. A trough-like housing made by casting in a mold, with a U-shaped cross section that is the same throughout its length, and with flat end side walls to accommodate a gas generator and an airbag for a passenger protection system in a motor vehicle, comprising two half shells of a substantially mirror-image configuration, with integrally molded side wall halves and means for joining the two half shells comprising outwardly projecting flanges in contact with one another when assembled and formed on the half shells in a bottom junction area.

2. The housing according to claim 1, wherein the side wall halves have openings for mounting a cylindrical gas generator.

3. The housing according to claim 1, wherein the half shells each have a bottom portion of quarter-circular shape.

4. The housing according to claim 1, wherein the flanges extend essentially only parallel to a plane of division of the housing and are configured for the insertion of self-tapping screws passing through both flanges.

5. The housing according to claim 1, wherein the flanges have a section running substantially parallel to a plane of division of the housing, as well as a section projecting outwardly therefrom at right angles, and that they are joined together by a clip reaching across the outwardly projecting section.

6. The housing according to claim 5, wherein the clip extends over the entire length of the housing.

7. The housing according to claim 6, wherein the clip consists of a plurality of sections distributed over the length of the housing.

8. The housing according to claim 1, wherein the means for joining further comprises fastening plates applied to the side wall halves which simultaneously serve for mounting the housing in the vehicle body.

9. The housing according to claim 1, wherein the half shells consist of an aluminum pressure casting alloy.

10. The housing according to claim 1, wherein the half shells consist of plastic.

11. The housing according to claim 10, wherein the two half shells are made simultaneously and are joined together by a film hinge in the area of the bottom junction surface.

12. The housing according to claim 1, wherein the walls of the half shells are reinforced internally and/or externally by a pattern of ribs.

13. A trough-like housing made by casting in a mold, with a U-shaped cross section that is the same throughout its length, and with flat end side walls to accommodate a gas generator and an airbag for a passenger protection system in a motor vehicle, comprising two half shells of a substantially mirror-image configuration, with integrally molded side wall halves and means for Joining the two half shells comprising in one junction surface of the half shell projecting centering bosses and in another junction surface of the other half shell corresponding recesses.

14. A trough-like housing made by casting in a mold, with a U-shaped cross section that is the same throughout its length, and with flat end side walls to accommodate a gas generator and an airbag for a passenger protection system in a motor vehicle, comprising two half shells of a substantially mirror-image configuration, with integrally molded side wall halves and means for joining the two half shells comprising the walls of the half shells having on the inside, at about half their height, confronting slot-like recesses extending over the entire length of the housing perpendicular to the walls, and into them the lateral edges of a holding plate for the airbag are inserted and can be fastened by no other means.

15. The housing according to claim 14, wherein the recesses are formed by two inwardly projecting, elongated ribs which are reinforced by ribs disposed perpendicular thereto.

16. The housing according to claim 1, wherein holes are provided at an upper end of the half shells on the entire periphery, for the insertion of self-tapping screws for fastening a cover.

17. The housing according to claim 1, wherein raised portions provided with holes are provided on the side wall halves for the insertion of self-tapping screws for attaching the mounting plates.

\* \* \* \* \*